United States Patent
Ito (10) Patent No.: US 9,686,534 B2
(45) Date of Patent: Jun. 20, 2017

(54) PROJECTION APPARATUS AND METHOD FOR CONTROLLING THE SAME, AND A COMPUTER-READABLE STORAGE MEDIUM

(71) Applicant: CANON KABUSHIKI KAISHA, Tokyo (JP)

(72) Inventor: Motohisa Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 14/794,130

(22) Filed: Jul. 8, 2015

(65) Prior Publication Data

US 2015/0312563 A1    Oct. 29, 2015

(30) Foreign Application Priority Data

Jul. 16, 2014    (JP) .................. 2014-146295

(51) Int. Cl.
  *H04N 13/04*    (2006.01)
  *H04N 9/31*    (2006.01)
  *H04N 13/00*    (2006.01)

(52) U.S. Cl.
  CPC ....... *H04N 13/0459* (2013.01); *H04N 9/3147* (2013.01); *H04N 13/0022* (2013.01); *H04N 13/0409* (2013.01); *H04N 13/0497* (2013.01)

(58) Field of Classification Search
  CPC .. G03B 21/26; G03B 21/625; G03B 21/2073; H04N 13/0404; H04N 13/0406; H04N 13/0409; H04N 13/0415; H04N 13/0456; G02B 2027/0129; G02B 2027/0132; G02B 2027/0172; G02B 2027/0178
  See application file for complete search history.

(56) References Cited

U.S. PATENT DOCUMENTS

| | | | |
|---|---|---|---|
| 8,531,444 B2 | 9/2013 | Ito | |
| 2003/0048354 A1* | 3/2003 | Takemoto | H04N 13/0048 348/51 |
| 2007/0109505 A1* | 5/2007 | Kubara | G03B 21/14 353/69 |
| 2007/0121182 A1* | 5/2007 | Fukushima | G02B 27/2214 359/9 |

(Continued)

FOREIGN PATENT DOCUMENTS

| | | |
|---|---|---|
| JP | 2010-085562 A | 4/2010 |
| JP | 2011-211693 A | 10/2011 |

*Primary Examiner* — Sultan Chowdhury
(74) *Attorney, Agent, or Firm* — Fitzpatrick, Cella, Harper & Scinto (57) ABSTRACT

A projection apparatus for projecting a plurality of stereoscopic images such that portions thereof overlap each other and displaying one stereoscopic image, the apparatus includes a projection unit adapted to project an indicator that is an image for adjusting a stereoscopic degree corresponding to a parallax between a projected left image and a projected right image, in an overlapping region where the plurality of stereoscopic images overlap each other; a detection unit adapted to detect a parallax between an indicator in the left image and an indicator in the right image based on a captured image of a projected indicator; and an adjustment unit adapted to adjust stereoscopic degrees of the plurality of stereoscopic images by an adjustment amount that is determined based on the detected parallax.

11 Claims, 7 Drawing Sheets

(56) References Cited

U.S. PATENT DOCUMENTS

| | | | |
|---|---|---|---|
| 2007/0211216 A1* | 9/2007 | Saishu | G02B 27/2214 353/7 |
| 2011/0157555 A1* | 6/2011 | Mashitani | G02B 27/2214 353/7 |
| 2011/0216205 A1 | 9/2011 | Flatt et al. | |
| 2012/0327199 A1* | 12/2012 | Chen | G02B 27/2214 348/51 |
| 2015/0177606 A1 | 6/2015 | Ito | |

* cited by examiner

PROJECTION APPARATUS AND METHOD FOR CONTROLLING THE SAME, AND A COMPUTER-READABLE STORAGE MEDIUM

BACKGROUND OF THE INVENTION

Field of the Invention

The present invention relates to projection apparatuses and methods for controlling the projection apparatuses, and a computer-readable storage medium, and relates in particular to techniques for projecting a stereoscopic image using a plurality of projectors.

Description of the Related Art

Stereoscopic images, which are images three-dimensionally perceived by an observer, have been widely used mainly in the fields of entertainment and education. Many stereoscopic images utilize spatial displacement between a left image viewed by the left eye of the observer and a right image viewed by the right eye thereof, i.e., a parallax. The observer three-dimensionally perceives an image by fusing, in the brain, the left image and the right image having the parallax. The stereoscopic effect perceived by the observer depends on the parallax. That is to say, the parallax need only be adjusted in order to change the stereoscopic effect to be perceived by the observer. Hereinafter, the stereoscopic effect perceived by the observer will be referred to as a "stereoscopic degree" only in the case where confusion will not occur.

Furthermore, the size of stereoscopic images has been increasing for the purpose of enhancing the impressiveness of the images and making the images more appealing. As a system for increasing the size of images, a multi-projection system has been widely used that combines a plurality of projection-type image display apparatuses to display one image. This is because a large screen can be easily configured by combining the plurality of projection-type image display apparatuses. Note that the multi-projection system is applicable not only to projection of stereoscopic images but also to projection of two-dimensional images.

The multi-projection system projects images such that a portion of a projected image overlaps a portion of an adjacent projected image in order to make the boundary between these projected images adjacent to each other less noticeable. However, even with projection apparatuses of the same model, a difference in tint, luminance, or the position or the shape of a displayed object may possibly exist between projected images due to variation and change over time of constituent elements (apparatuses and devices serving as components) constituting the projection apparatuses. If a difference exists between the projected images, a plurality of images exist in an overlapping region where a plurality of projected images overlap each other, the image quality deteriorates, and the observer feels a sense of incongruity. Accordingly, the difference between the projection apparatuses needs to be reduced such that the tint, the luminance, and the position and the shape of a displayed object are consistent between projected images with which the overlapping region is projected.

Furthermore, in the case of a multi-projection system that projects stereoscopic images, the stereoscopic degree must be consistent between the overlapping region and the other region. For example, it is assumed that one display target (e.g., projected image) exists spanning the overlapping region and the other region. If the stereoscopic degree is inconsistent between the overlapping region and the other region, the display target discontinuously changes at the boundary between the overlapping region and the other region. If the display target discontinuously changes even though this display target is a single object, the possibility arises that the stereoscopic image quality thereof deteriorates, the observer gets confused, and it becomes difficult to view the display target as a stereoscopic image, or the observer feels more fatigued due to viewing the stereoscopic image. For this reason, in the multi-projection system that projects stereoscopic images, it is necessary to adjust, in addition to the aforementioned item, the parallax, i.e., displacement between the left image and the right image and reduce a difference in the stereoscopic degree in order to prevent a difference from occurring in the stereoscopic degree between the overlapping region and the other region.

In this regard, a technique for reducing such a difference between images in the multi-projection system has been proposed. Japanese Patent Laid-Open No. 2010-085562 describes a technique by which projection apparatuses project different reference patterns and cameras of the projection apparatuses photograph these reference patterns. In this configuration, the position of a point of measurement is calculated to adjust a display position based on the photographed reference patterns. With this configuration, the influence of a difference in the position or the shape of a displayed object can be reduced.

Japanese Patent Laid-Open No. 2011-211693 describes a technique by which a reference pattern is projected using invisible light and this reference pattern is photographed by a camera of a projection apparatus. In this configuration, the position of a point of measurement is calculated to adjust a display position based on the photographed reference pattern. With this configuration, since the reference pattern is projected using invisible light, the adjustment can be performed even while actual images are being projected.

However, with the configuration in Japanese Patent Laid-Open No. 2010-085562, the display position is adjusted independently from actual image projection, and therefore displacement in the images cannot be adjusted while the actual images are being projected. Accordingly, this configuration cannot deal with a difference in the stereoscopic degree that occurs while the actual images are being projected.

Moreover, since this configuration does not include a configuration for measuring a difference in the stereoscopic degree, the stereoscopic degree cannot be adjusted.

SUMMARY OF THE INVENTION

The present invention has been made in order to solve the foregoing problems. The invention provides a technique for enabling a difference in a stereoscopic degree occurring between an overlapping region and the other region to be adjusted in a multi-projection system for projecting a stereoscopic image.

According to one aspect of the present invention, a projection apparatus for projecting a plurality of stereoscopic images such that portions thereof overlap each other and displaying one stereoscopic image, the apparatus includes: a projection unit adapted to project an indicator that is an image for adjusting a stereoscopic degree corresponding to a parallax between a projected left image and a projected right image, in an overlapping region where the plurality of stereoscopic images overlap each other; a detection unit adapted to detect a parallax between an indicator in the left image and an indicator in the right image based on a captured image of a projected indicator; and an adjustment unit adapted to adjust stereoscopic degrees of the plurality of stereoscopic images by an adjustment amount that is determined based on the detected parallax.

According to another aspect of the present invention, a method for controlling a projection apparatus for projecting a plurality of stereoscopic images such that portions thereof overlap each other and displaying one stereoscopic image, the method includes: a projection step of projecting an indicator that is an image for adjusting a stereoscopic degree corresponding to a parallax between a projected left image and a projected right image, in an overlapping region where the plurality of stereoscopic images overlap each other, by a projection unit; a detection step of detecting a parallax between an indicator in the left image and an indicator in the right image based on a captured image of a projected indicator, by a detection unit; and an adjustment step of adjusting stereoscopic degrees of the plurality of stereoscopic images by an adjustment amount that is determined based on the detected parallax, by an adjustment unit.

Further features of the present invention will become apparent from the following description of exemplary embodiments with reference to the attached drawings.

DESCRIPTION OF THE EMBODIMENTS

Embodiments of the present invention will be hereinafter described with reference to the attached drawings. However, the embodiments and the details of the invention may be changed without departing from the gist and the scope of the invention. Accordingly, the invention is not limited to the embodiments described below. The following embodiments may be implemented on hardware or may be implemented by software, unless otherwise stated. Note that members having the same functions will be given the same reference numerals in principle, and a repetitive description thereof will be omitted.

In a stereoscopic view, a too large stereoscopic degree may possibly increase a sense of fatigue, and on the contrary, a too small stereoscopic degree makes a stereoscopic image less attractive. That is to say, in a stereoscopic view, a stereoscopic degree that is most suitable for observation exists. This stereoscopic degree that is most suitable for observation will be hereinafter referred to as a "target stereoscopic degree". Note that the present invention does not depend on a value of the target stereoscopic degree, and accordingly the target stereoscopic degree can be determined using any method. Here, the stereoscopic degree means a degree of a stereoscopic effect perceived by an observer, as mentioned above. The stereoscopic degree corresponds to a parallax between a projected right image and left image, and the stereoscopic degree increases as the parallax between the right image and the left image gets larger. On the other hand, the stereoscopic degree decreases as the parallax between the right image and the left image gets smaller.

Stereoscopic Image Projection Apparatus

Figure 1:
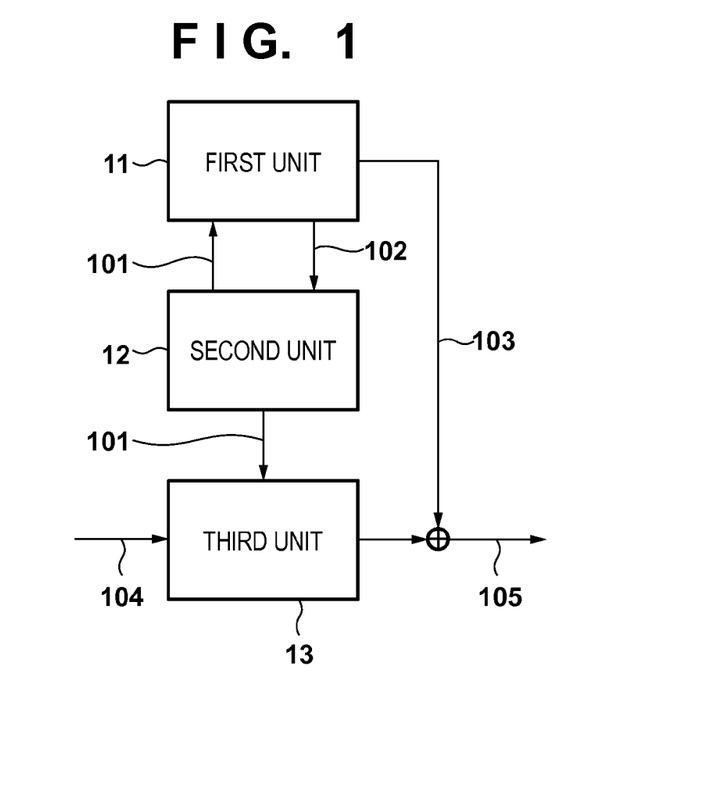
FIG. 1 is a block diagram showing a functional configuration of a stereoscopic image projection apparatus.

In an embodiment of the invention, a stereoscopic view is achieved by a parallax method. FIG. 1 is a block diagram schematically showing a functional configuration of a stereoscopic image projection apparatus (hereinafter referred to as a "projection apparatus") according to the present embodiment.

As shown in FIG. 1, the projection apparatus according to the present embodiment has a first unit 11, a second unit 12, and a third unit 13. The first unit 11 is a unit that generates a mark which is to be used in adjustment of the stereoscopic degree and is constituted by a plurality of objects having different stereoscopic degrees. Hereinafter, this mark which is to be used in the adjustment of the stereoscopic degree and is constituted by a plurality of objects having different stereoscopic degrees will be referred to as an "indicator". The second unit 12 is a unit that calculates an adjustment amount 101. The second unit 12 photographs an indicator generated by the first unit 11 and projected on a screen (not shown), and calculates the adjustment amount 101 based on a parallax of the photographed indicator and a target parallax (target value). The third unit 13 is a unit that inputs a stereoscopic image 104 and adjusts the stereoscopic degree that the input stereoscopic image 104 has, in accordance with the adjustment amount 101 calculated by the second unit 12. A stereoscopic image 103 of the indicator generated by the first unit 11 is overlapped with the stereoscopic image whose stereoscopic degree has been adjusted by the third unit 13, and an output stereoscopic image 105 is generated. The output stereoscopic image 105 is projected on the screen. Note that an object to which the image is projected is not limited to the screen, and the image may be projected on any object such as a building or an indoor wall.

In the configuration in the present embodiment, in a multi-projection system in which a plurality of partial stereoscopic images are projected such that portions thereof overlap one another to display one stereoscopic image, an invisible light indicator overlapped with the projected images is photographed, a parallax is detected, and the adjustment amount of the parallax is calculated. The parallax that an input stereoscopic image to be displayed has is then adjusted by the calculated adjustment amount, and a stereoscopic image to be output is generated. Therefore, with the configuration in the present embodiment, the stereoscopic degree of the projected images can be adjusted while actual images are being projected, and continuity of the stereoscopic degree between an overlapping region and the other region can be maintained. Although the present embodiment will describe a case of performing processing on a moving image (image) that serves as a stereoscopic image to be displayed, it should be noted that the same processing can be performed on a still image.

The projection apparatus according to the present embodiment can be configured by connecting a plurality of projectors. Here, each projector includes an input unit that inputs a stereoscopic image signal, a signal processing unit that performs signal processing on the stereoscopic image signal, a CPU that governs control of the overall apparatus, a display unit that optically outputs an image signal to the screen, and the like. Furthermore, as described later, the projection apparatus in the present embodiment also includes, in the second unit, a photographic apparatus capable of photographing invisible light, in order to photograph the indicator. Each functional element described above referring to FIG. 1 is achieved by one CPU in the plurality of projectors performing predetermined information processing using a work area in a memory, storage, or the like based on a predetermined computer program. However, all or some of the functional elements in FIG. 1 may be achieved by dedicated hardware such as embedded equipment or an electric circuit. Also, the projection apparatus may be achieved by an information processing apparatus such as a PC or a tablet terminal that is connected to the plurality of projectors for optically outputting a stereoscopic image and includes the photographic apparatus for photographing invisible light.

Projection by Multi-Projection System

Figure 2:
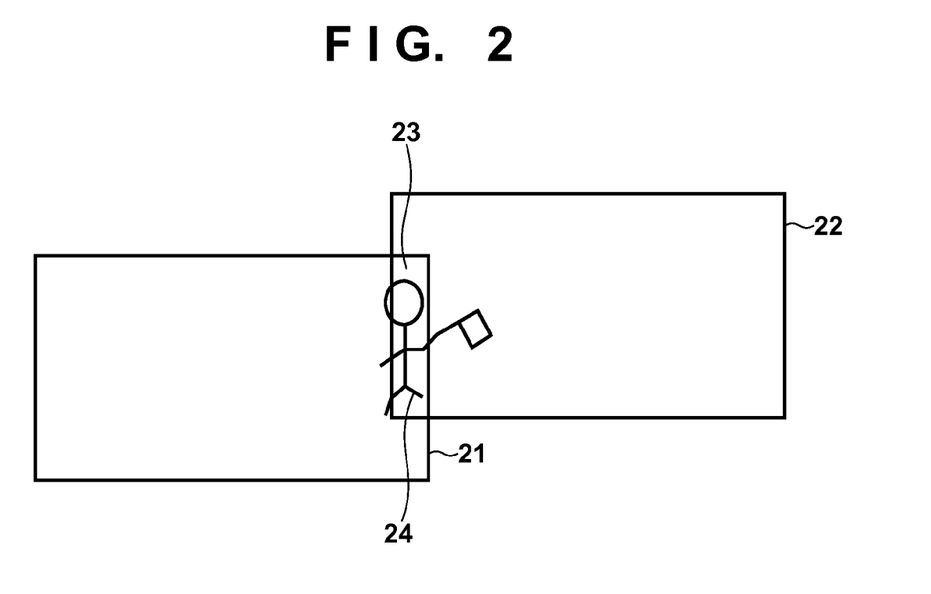
FIG. 2 is a diagram showing an exemplary multi-projection system.

Prior to a detailed description of each constituent element according to the present embodiment, exemplary projection performed by the multi-projection system to which the projection apparatus according to the present embodiment is applied will be described using FIG. 2. In a stereoscopic image shown in FIG. 2, a first projected image 21 and a second projected image 22 are combined in the horizontal direction to configure one stereoscopic image. For this combination, the first projected image 21 and the second projected image 22 are combined so as to be shifted from each other in the vertical direction. To make the boundary between the adjacent projected images less noticeable, the first projected image 21 and the second projected image 22 are projected while overlapping partial regions of the first projected image 21 and the second projected image 22 with each other. This overlapping projection region is an overlapping region 23.

Here, in the present embodiment, the first projected image 21 and the second projected image 22 are stereoscopic images projected by projection apparatuses of the same model. Even if the same stereoscopic images are projected with the same parallax by the projection apparatuses of the same model, the same stereoscopic degree is not always obtained due to variation and change over time of constituent elements constituting the projection apparatuses. For example, in FIG. 2, there is a possibility that stereoscopic degrees of a person 24 in the first projected image 21, the second projected image 22, and the overlapping region 23 are different from one another. If the stereoscopic degrees in the respective regions are different, the person 24, which is a single object, is discontinuous at the boundary between the first projected image 21 and the overlapping region 23 and the boundary between the overlapping region 23 and the second projected image 22. If a single object is discontinuous, the possibility arises that the stereoscopic image quality thereof deteriorates, the observer gets confused, and it becomes difficult to view the object as a stereoscopic image, or the observer feels more fatigued due to viewing the stereoscopic image.

Indicator

Figure 3A:
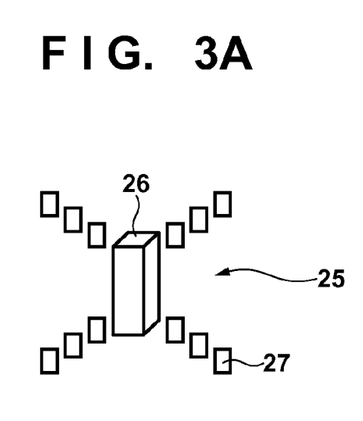
FIGS. 3A and 3B are diagrams showing an exemplary indicator.
Figure 3B:
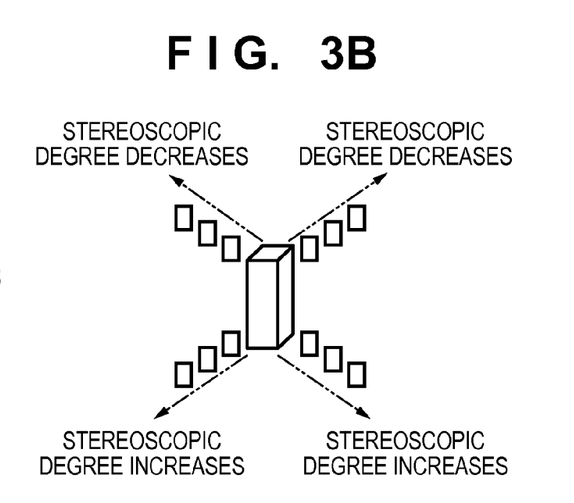

Subsequently, an embodiment of an indicator 25 generated by the first unit 11 will be described using FIGS. 3A and 3B. FIG. 3A is a diagram showing an embodiment of the indicator 25. The indicator 25 is constituted by a plurality of parts, and the plurality of parts include parts having different stereoscopic degrees. The indicator 25 shown in FIG. 3A is constituted by one major indicator 26 and minor indicators 27 arranged around the major indicator 26 so as to intersect the major indicator 26.

By differentiating the stereoscopic degrees of the plurality of parts as in the present embodiment, a difference between a reference stereoscopic degree and a current stereoscopic degree can be detected. Furthermore, it is possible to obtain an adjustment value of a parallax between a right image and a left image necessary for setting the stereoscopic degree of a projected image to the reference stereoscopic degree.

Figure 10:
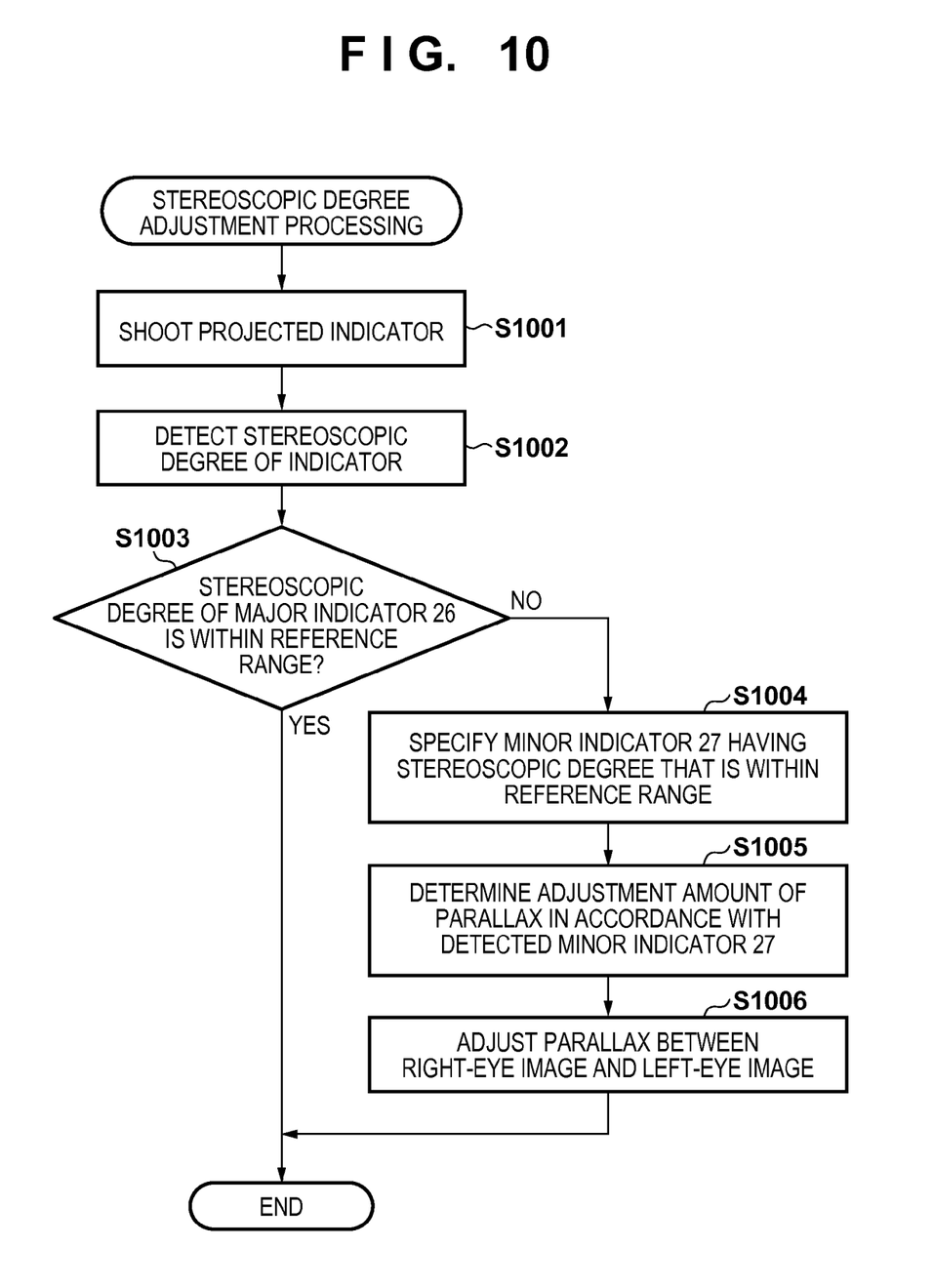
FIG. 10 is a flowchart showing a procedure of processing for adjusting a stereoscopic degree using the indicator.

The stereoscopic degree adjustment using the indicator 25 will be described using FIG. 10. In a mode in which the projection apparatus contains a processor and a memory, the processing shown in FIG. 10 is achieved by the processor executing a program stored in the memory. Alternatively, a part or all of the processing in FIG. 10 may be performed by hardware.

Initially, the projection apparatus according to the present embodiment photographs a projected indicator 25 (S1001). Then, the stereoscopic degree of the indicator 25 is detected from the captured image obtained by the photographing (S1002). Next, it is determined whether the stereoscopic degree of the major indicator 26 in the plurality of parts constituting the indicator 25 is within a predetermined reference value range (S1003).

If the stereoscopic degree of the major indicator 26 is within the reference value range (YES in S1003), it is determined that the parallax between the right image and the left image does not need to be adjusted, and the processing ends.

On the other hand, if the stereoscopic degree of the major indicator 26 is out of the reference value range (NO in S1003), an adjustment value for adjusting the parallax between the right image and the left image is detected using the minor indicator 27. In the present embodiment, a minor indicator 27 whose stereoscopic degree is within a reference stereoscopic degree range is detected from among the plurality of parts (S1004). Next, the adjustment amount of the parallax between the right image and the left image is determined in accordance with the detected minor indicator 27 (S1005). Then, the parallax between the right image and the left image is adjusted based on the determined adjustment amount (S1006).

For example, if the part having a stereoscopic degree within the reference range is a minor indicator 27 having a larger stereoscopic degree than the stereoscopic degree of the major indicator, it is determined that the parallax between the right image and the left image needs to be reduced to decrease the stereoscopic degree of the entire screen. By thus reducing the parallax between the right image and the left image, the parallax can be adjusted so as to set the stereoscopic degree of the major indicator 26 to the reference stereoscopic degree.

On the other hand, for example, if the part having a stereoscopic degree within the reference range is a minor indicator 27 having a smaller stereoscopic degree than the stereoscopic degree of the major indicator, it is determined that the parallax between the right image and the left image needs to be increased to increase the stereoscopic degree of the entire screen. By thus increasing the parallax between the right image and the left image, the parallax can be adjusted so as to set the stereoscopic degree of the major indicator 26 to the reference stereoscopic degree.

A further detailed description will be given of features of the indicator 25 as well as the major indicator 26 and the minor indicators 27 constituting the indicator 25 in the present embodiment. The indicator 25, and the major indicator 26 and the minor indicators 27 constituting the indicator 25 in the present embodiment have the following features.

(A) Both the major indicator 26 and the minor indicators 27 of the indicator 25 are generated by invisible light.

(B) The stereoscopic degree of the major indicator 26 is a target stereoscopic degree, and the stereoscopic degrees of the minor indicators 27 are different from the stereoscopic degree of the major indicator 26.

(C) The size of the indicator 25 is a size conforming to a position at which the indicator 25 is arranged.

(D) The size of the minor indicators 27 is smaller than the size of the major indicator 26.

Both the major indicator 26 and the minor indicators 27 of the indicator 25 are generated by invisible light (feature A). This is for enabling the projection apparatus according to the present embodiment to adjust a stereoscopic degree without affecting a displayed image. The invisible light used for the indicator 25 has a wavelength that does not affect a projected image, and this wavelength may be any wavelength that is supported by a light source, a display element, and an optical system of the projection apparatus according to the present embodiment, or the screen. For example, a wavelength can be used that is in a near infrared band of wavelengths of 0.7 to 2.5 μm and is not used by a remote controller or in close proximity communication.

The stereoscopic degree of the major indicator 26 is set as a target stereoscopic degree, i.e., a stereoscopic degree that is most suitable for observation in the multi-projection system according to the present embodiment. The minor indicators 27 are configured to have stereoscopic degrees that are different from the stereoscopic degree of the major indicator 26 (feature B). However, not all stereoscopic degrees of the minor indicators 27 need to be different from one another, and some of the minor indicators 27 may have the same stereoscopic degree. FIG. 3B shows a relationship between the stereoscopic degrees of the major indicator 26 and the minor indicators 27 in the present embodiment. As shown in FIG. 3B, the stereoscopic degrees that the minor indicators 27 have monotonically increase as the minor indicators 27 are located further in a proximal direction with respect to the major indicator 26, with the stereoscopic degree of the major indicator 26 as a reference. On the contrary, the stereoscopic degrees that the minor indicators 27 have monotonically decrease as the minor indicators 27 are located further in a distal direction with respect to the major indicator 26. Detection of a transition of the stereoscopic degree in a projected image can be facilitated by arranging the major indicator 26 and the minor indicators 27 to configure the indicator 25 as shown as an example in FIGS. 3A and 3B.

For the purpose of accurately detecting a transition of the stereoscopic degree in a projected image, the entire indicator 25 is displayed within the projected image. For the same purpose, when arranging the indicator 25 in the overlapping region 23, the major indicator 26 and one or more minor indicators 27 are arranged in the overlapping region 23, and another one or more minor indicators 27 are arranged in a region other than the overlapping region 23. For this reason, the size of the indicator 25 depends on the position at which the indicator 25 is arranged (feature C). Accordingly, the size of the major indicator 26 also depends on the position at which the indicator 25 is arranged.

Furthermore, for the purpose of facilitating the detection of a transition in the stereoscopic degree of a projected image, the size of the minor indicators 27 is made smaller than the size of the major indicator 26 (feature D). Accordingly, since the size of the indicator 25 and the size of the major indicator 26 depend on the position at which the indicator 25 is arranged due to the aforementioned feature C, the size of the minor indicators 27 and the number of minor indicators 27 also depend on the position at which the indicator 25 is arranged.

In the case of arranging a plurality of indicators 25, a common, unified indicator 25 applicable to all indicators 25 can be defined and used. Of course, a plurality of types of indicators 25 may be used while defining the size and the shape of the major indicator 26 and the size, the shape, and the number of minor indicators 27 for each arrangement position. Also, by arranging the minor indicators 27 in a plurality of directions with respect to the major indicator 26 as shown in FIG. 3A, if displacement exists between the left image and the right image, the displacement can be detected whichever direction the direction of the displacement is.

A generation position of the indicator 25 is predefined, and is set and stored in the first unit 11. The size and the shape of the major indicator 26 and the minor indicators 27 as well as the number of minor indicators 27 can also be defined together with the generation position of the indicator 25. For this reason, the size and the shape of the major indicator 26 and the minor indicators 27 as well as the number of minor indicators 27 are also predefined and stored in the first unit 11.

Figure 4:
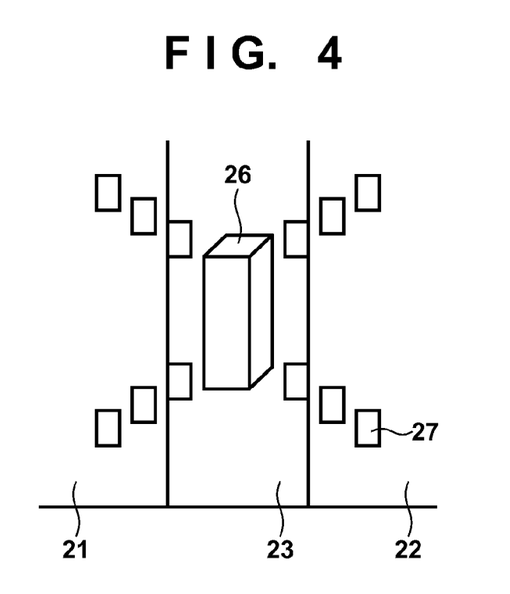
FIG. 4 is a diagram showing an example in which the indicator is arranged in an overlapping region.

Some of the plurality of parts (major indicator 26, minor indicators 27) are generated within a region in which stereoscopic images overlap each other, and the remaining parts are generated outside the overlapping region. FIG. 4 is a diagram showing an exemplary arrangement of the indicator 25 in the overlapping region 23. In the example in FIG. 4, the major indicator 26 and a total of four minor indicators 27 adjacent to the major indicator 26 are arranged in the overlapping region 23. The remaining minor indicators 27 are arranged in a region other than the overlapping region 23, i.e., the first projected image 21 and the second projected image 22. Accordingly, a relationship of [Expression 1] holds between the width wm of the major indicator 26, the width ws of each minor indicator 27, and the width W of the overlapping region 23.

$$W > wm + 2 \times (ws + d) \quad \text{[Expression 1]}$$

Note that d in [Expression 1] above indicates an interval in the horizontal direction between the major indicator 26 and the minor indicators 27. When installing the projection apparatus according to the present embodiment, the width W of the overlapping region 23 is fixed. Accordingly, wm and ws that satisfy [Expression 1] can also be determined when installing the projection apparatus according to the present embodiment, and the determined wm and ws are set and stored in the unit 11.

(First Unit)

Specific processing content of the aforementioned stereoscopic degree adjustment using the indicator 25 will be described below. In the present embodiment, the indicator 25 is generated for each of the partial stereoscopic images 21 and 22, and the stereoscopic degrees of the stereoscopic images 21 and 22 are adjusted based on the respective indicators 25 so as to be brought close to a predetermined target. However, it should be noted that the invention is not limited thereto. For example, the adjustment may be performed such that the stereoscopic degree of the stereoscopic image 21 is brought close to the stereoscopic degree of the stereoscopic image 22.

Figure 5:
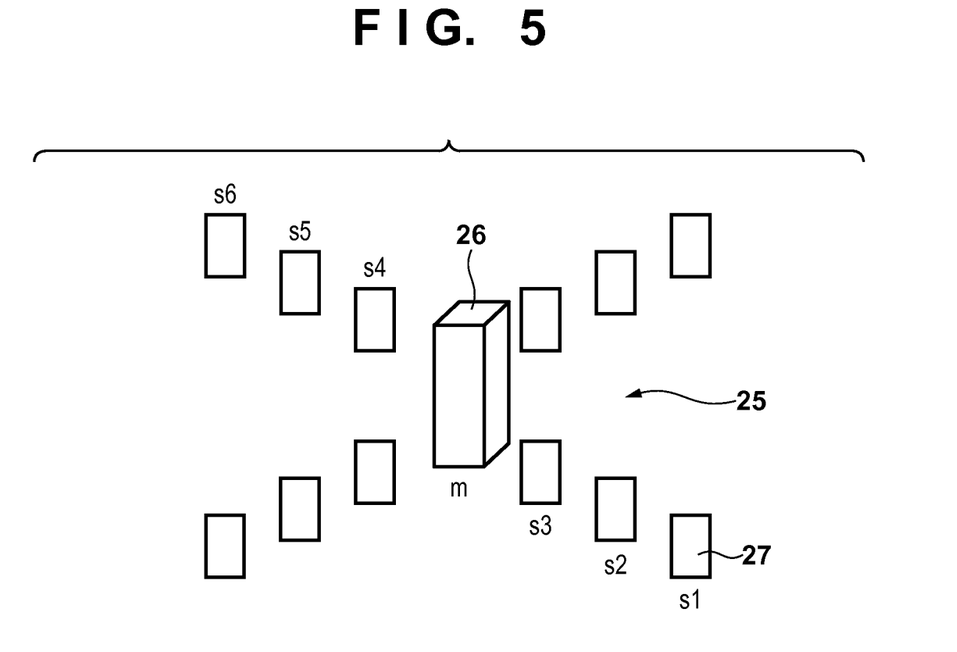
FIG. 5 is a diagram showing parallaxes that a major indicator and minor indicators have.

Subsequently, operations of the first unit 11 will be described in detail. As mentioned above, the first unit 11 generates the indicator, which is a stereoscopic image to serve as a mark for adjusting the stereoscopic degree, in the region where partial stereoscopic images overlap each other. In the description, attention will be paid to the major indicator 26 and a line of the minor indicators 27 that are sequentially arranged from the upper left to the lower right in the indicator 25. Parallaxes that the major indicator 26 and the minor indicators 27 sequentially arranged from the upper left to the lower right have are defined as shown in FIG. 5. In FIG. 5, s1 to s6 indicate parallaxes that the respective minor indicators 27 have, and m indicates the parallax that the major indicator 26 has. As shown in FIG. 3B, the stereoscopic degree increases toward the proximal side, and the stereoscopic degree decreases toward the distal side. Accordingly, a relationship indicated by [Expression 2] exists between s1 to s6 and m.

$$s1 > s2 > s3 > m > s4 > s5 > s6 \qquad \text{[Expression 2]}$$

It is assumed that an initial value of the parallax m that the major indicator 26 has is $Pm_0$. The value of $Pm_0$ is a parallax that is calculated from design specifications of the projection apparatus according to the present embodiment and is necessary for obtaining the target stereoscopic degree. Since this value of $Pm_0$ depends on the design specifications of the projection apparatus according to the present embodiment, the value is calculated in advance and stored in the first unit 11. Furthermore, initial values of the parallaxes s1 to s6 that the minor indicators 27 have are indicated by [Expression 3].

$$(s1, s2, \ldots, s6) = (Ps1_0, Ps2_0, \ldots, Ps6_0) \qquad \text{[Expression 3]}$$

The initial values of the minor indicators 27 indicated by [Expression 3] are calculated by following procedures (1-1) and (1-2). As shown in the following procedures (1-1) and (1-2), the parallax of each minor indicator 27 depends only on the target stereoscopic degree and the definition of the indicator 25, and accordingly can be calculated in advance. Here, the indicator 25 is defined by the size and the shape of the major indicator 26, as well as the size, the shape, the number, and the arrangement of the minor indicators 27. The initial values of the parallaxes (s1 to s6) of the minor indicators 27 are calculated in advance and stored in the first unit 11, similarly to the initial value $Pm_0$ of the parallax m that the major indicator 26 has.

(1-1) Calculate the stereoscopic degree of each minor indicator 27 from the target stereoscopic degree and the definition of the indicator 25

(1-2) Calculate a parallax necessary for obtaining the calculated stereoscopic degree, based on design specifications of the projection apparatus according to the present embodiment The first unit 11 generates one or more indicators 25 for the overlapping region 23 at one portion. The generation position thereof is a position spanning the overlapping region 23 and the other region. The indicator 25 may be or may not be generated in the region other than the overlapping region 23. In the case of generating the indicator 25 only in the region other than the overlapping region 23, the indicator 25 is generated at the center of a region excluding the overlapping region 23 such that none of the major indicator 26 and the minor indicators 27 are located in the other region.

Figure 6:
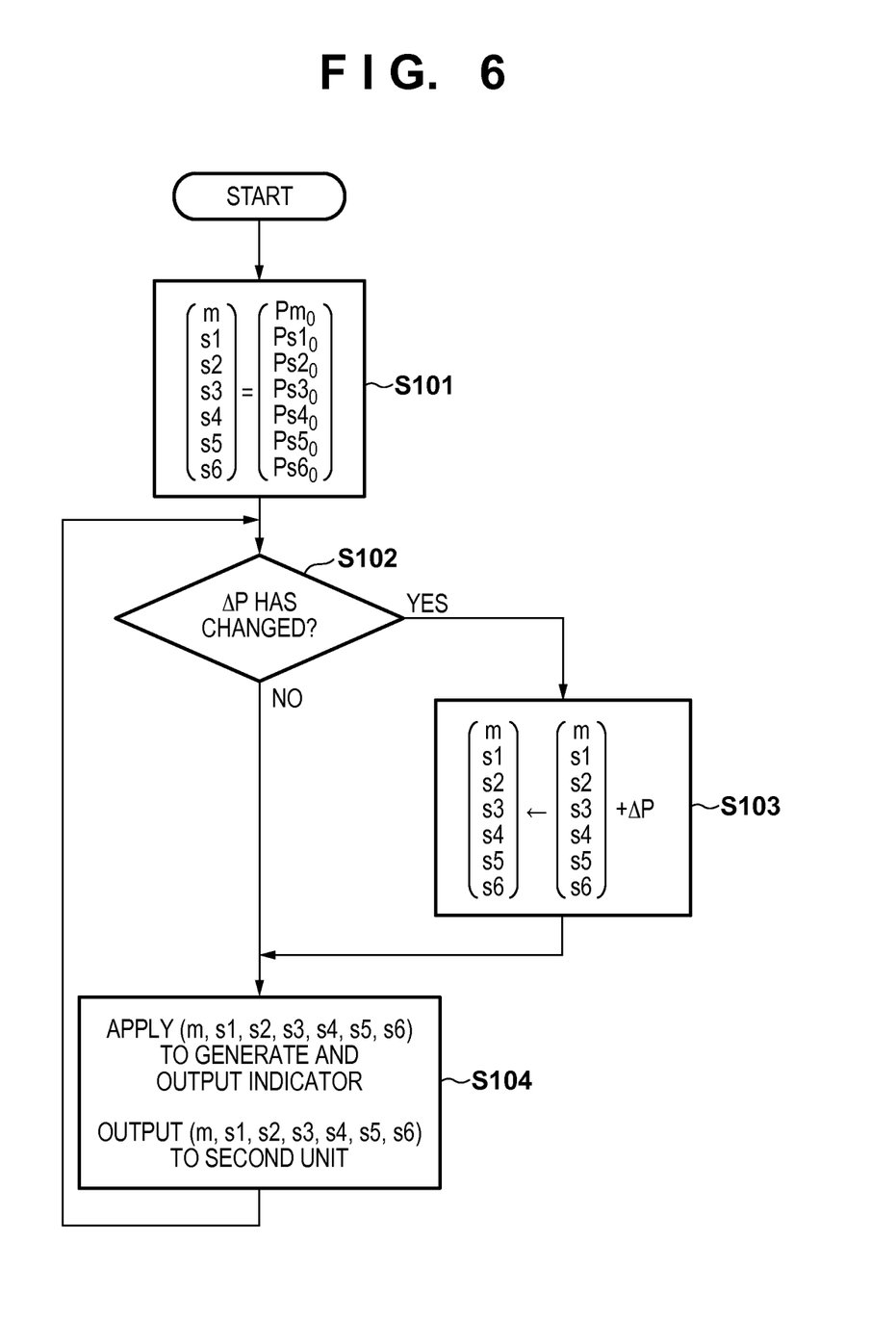
FIG. 6 is a diagram showing a procedure for generating the indicator.

A procedure for the first unit 11 generating the indicator 25 will be described in detail with reference to FIG. 6. FIG. 6 is a flowchart showing a procedure for generating the indicator. The first unit 11 generates the indicator 25 through four steps from step S101 to step S104. The following processing steps are executed based on the control of a CPU of the projection apparatus.

In step S101, the parallax m of the major indicator 26 and the parallaxes s1 to s6 of the minor indicators 27 are initialized. As mentioned above, the initial value of the parallax m of the major indicator 26 is $Pm_0$, and the initial values of the parallaxes s1 to s6 of the minor indicators 27 are values indicated by [Expression 3], and these values are preset. That is to say, it is assumed that (m, s1, s2, ..., s6)=($Pm_0$, $Ps1_0$, $Ps2_0$, ..., $Ps6_0$).

In step S102, it is determined whether or not the adjustment amount 101 has changed. Here, the adjustment amount 101 is an adjustment amount by which the stereoscopic degree of a projected image is adjusted to the target stereoscopic degree. This adjustment amount 101 is generated by the second unit 12 and output to the first unit 11 and the third unit 13. Hereinafter, the value of the adjustment amount 101 will be indicated by ΔP. Although ΔP is a scalar quantity, a vector quantity having multi-dimensional components will also be indicated similarly as ΔP. In the case where ΔP indicates a vector quantity, each component of this vector has the same value (ΔP serving as a scalar quantity).

If the value ΔP of the adjustment amount 101 has changed (YES in S102), the processing is branched to step S103, and the parallaxes are adjusted before generating the indicator 25. If ΔP has not changed (NO in S102), the parallaxes do not need to be adjusted. Therefore, the processing is branched to step S104 and the indicator 25 is generated using the current parallaxes.

In step S103, the parallaxes of the major indicator 26 and the minor indicators 27 are adjusted using the value ΔP of the adjustment amount 101. That is to say, (m, s1, s2, ..., s6)+ΔP is set as new (m, s1, s2, ..., s6).

In step S104, the stereoscopic image 103 of the indicator is generated and output using the parallax m of the major indicator 26 and the parallaxes s1 to s6 of the minor indicators 27. Values stored in the first unit 11 are applied to factors other than the parallaxes among specifications relating to generation of the stereoscopic image 103 of the indicator, i.e., the generation position of the indicator 25, the size and the shape of the major indicator 26, and the size and the shape of the minor indicators 27 as well as the number of minor indicators 27. Also, in step S104, simultaneously, the parallaxes 102 (m, s1, s2, ..., s6) given to the major indicator and the minor indicators are output to the second unit. Here, the parallaxes 102 given to the major indicator and the minor indicators are the parallax m of the major indicator 26 and the parallaxes s1 to s6 of the minor indicators 27 that are used in generation of the stereoscopic image 103 of the indicator. Then the processing returns to step S102.

(Second Unit)

Next, functions of the second unit 12 will be described in detail. The second unit 12 is a unit that calculates the adjustment amount 101 (ΔP) from the projected image of the indicator 25 projected by the projection apparatus according to the present embodiment. That is to say, the second unit 12 detects a parallax between the left image and the right image of the indicator based on the captured image of this indicator, compares the detected parallax with a predetermined target parallax value, and calculates the adjustment amount of the stereoscopic degree. The second unit 12 has at least the following three units.

(a) A unit that photographs the projected indicator 25

(b) A unit that calculates the parallaxes of the major indicator 26 and the minor indicators 27 from the image of the projected indicator 25

(c) A unit that calculates the adjustment amount 101 from the calculated parallaxes and the target parallax value The unit that photographs the projected indicator 25 needs to be sufficiently sensitive to a wavelength range of invisible light used to display the indicator 25. Also, in order to calculate the stereoscopic degree from the parallax of the photographed indicator 25, i.e., an amount of displacement between the left image and the right image, a spatial resolution needs to be provided with which the amount of displacement can be measured with an accuracy that is sufficient for calculating the stereoscopic degree. In the case of using a near infrared band of wavelengths of 0.7 to 2.5 μm for displaying the indicator 25, the unit that photographs the projected indicator 25 may be a two-dimensional CCD (Charge-Coupled Device) element equipped with a visible-light filter, for example. Of course the unit that photographs the projected indicator 25 is not limited to the CCD.

The unit that calculates the parallaxes of the major indicator 26 and the minor indicators 27 extracts the left image and the right image of the indicator 25 from the image of the projected indicator 25, and calculates the amount of displacement therebetween, i.e., the parallax for each of the major indicator 26 and the minor indicators 27. As in the description of the first unit 11, the major indicator 26 and a line of the minor indicators 27 that are sequentially arranged from the upper left to the lower right in the indicator 25 will be described as an example. It is assumed that the calculated parallax of the major indicator 26 is $Pm_a$, and the calculated parallaxes of the minor indicators 27 are $Ps1_a$, $Ps2_a$, $Ps3_a$, $Ps4_a$, $Ps5_a$, and $Ps6_a$.

Lastly, the unit that calculates the adjustment amount 101 compares the parallaxes of captured images of parts (major indicator 26, minor indicators 27) having different stereoscopic degrees with the target parallax value, and calculates the adjustment amount 101. Specifically, the adjustment amount 101 is calculated through the following four steps (2-1) to (2-4).

(2-1) Calculate differences between the parallaxes of the major indicator 26 and the minor indicators 27 and the target parallax value (2-2) Derive a relational expression between the differences in the parallax and the parallaxes given to the major indicator and the minor indicators (2-3) Calculate the parallax of the indicator 25 based on the derived relational expression (2-4) Calculate the adjustment amount 101 from the parallax of the indicator 25 and the target parallax value It is assumed that the target parallax value is Pe, and the difference between measured values ($Pm_a$, $Ps1_a$, $Ps2_a$, ..., $Ps6_a$) of the parallaxes and the target value Pe is ΔPe. In step (2-1), calculation indicated by [Expression 4] is performed to calculate ΔPe.

$$\Delta Pe = (Pm_a, Ps1_a, Ps2_a, \ldots, Ps6_a) - (P_e, P_e, P_e, \ldots, P_e) \quad \text{[Expression 4]}$$

Figure 7A:
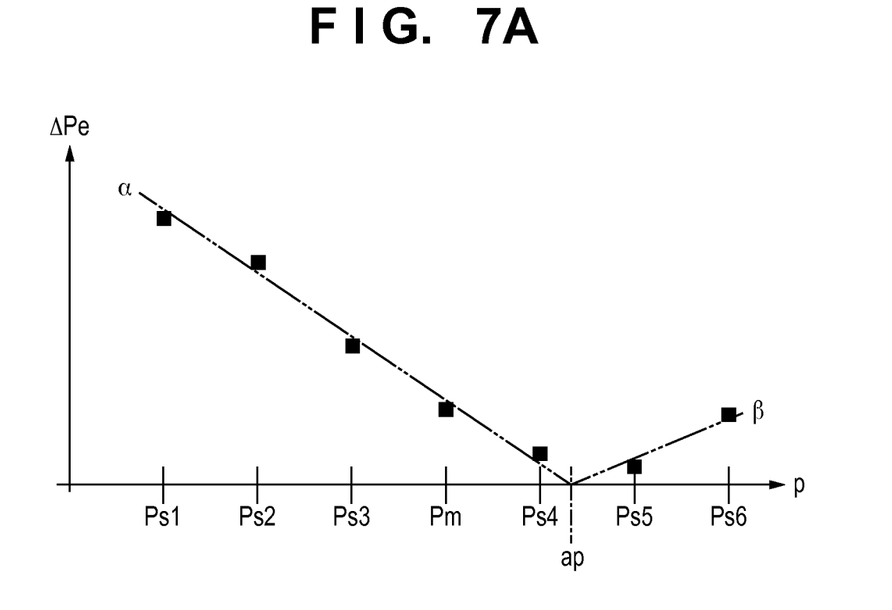
FIGS. 7A and 7B are diagrams showing a correlation between parallaxes given to the major indicator and the minor indicators and a difference in the parallax.

In step (2-2), the relational expression between the difference in the parallax and the parallaxes given to the major indicator and the minor indicators is obtained by applying a least squares method to ΔPe calculated in step (2-1) and a set of the parallaxes 102 given to the major indicator and the minor indicators that are input from the first unit 11. This processing will now be described using correlation diagrams shown in FIGS. 7A and 7B. FIG. 7A is a correlation diagram showing a relationship between ΔPe and the parallaxes 102 given to the major indicator and the minor indicators. In this diagram, the values of the parallaxes 102 given to the major indicator and the minor indicators are indicated by p. FIG. 7A illustrates an exemplary case where the relationship between the parallaxes p and the difference ΔPe from the target parallax value is approximated by straight lines α and β using the least squares method. In the present embodiment, the relationship between m and s1, s2, ..., s6 is given by [Expression 2]. For this reason, in FIG. 7A, if intervals among Ps1, ..., Ps6 are set in accordance with the values of s1-s2, s2-s3, s3-m, m-s4, s4-s5, and s5-s6, ΔPe is approximated by straight lines. For example, in the case where the values of s1-s2, s2-s3, s3-m, m-s4, s4-s5, and s5-s6 are the same, if Ps1, ..., Ps6 are set at equal intervals in the correlation diagram in FIG. 7A, ΔPe is approximated by the straight lines α and β shown in FIG. 7A.

Figure 7B:
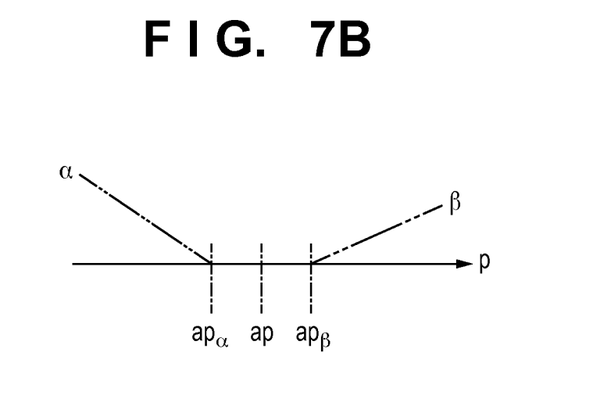

In step (2-3), the parallax ap of the indicator 25 is calculated based on the relational expression derived in step (2-2). FIG. 7B is a diagram enlarging the vicinity in which the straight lines α and β intersect ΔPe=0. In FIG. 7B, the value of p at the point at which the straight line α intersects ΔPe=0 is $ap_α$, and the value of p at the point at which the straight line β intersects ΔPe=0 is $ap_β$. It is assumed that the parallax ap of the indicator 25 to be obtained is a midpoint between $ap_α$ and $ap_β$. Then, ap is derived by [Expression 5].

$$ap = (ap_α + ap_β)/2 \quad \text{[Expression 5]}$$

Lastly, in step (2-4), the adjustment amount 101 is calculated. Since the target parallax ma is given to the major indicator 26, the value ΔP of the adjustment amount 101 is a value indicated by [Expression 6].

$$\Delta P = ap - ma \quad \text{[Expression 6]}$$

Although the second unit 12 may calculate the adjustment amount 101 for each frame in the present embodiment, the present invention is not limited thereto. For example, the adjustment amount 101 may be calculated only in the case where a condition indicated by [Expression 7] holds, i.e., only in the case where the absolute value of the difference between the target parallax ma and the measured parallax ap of the indicator 25 exceeds a predefined threshold $p_{th}$. If the value of the threshold $p_{th}$ is large, the adjustment frequency decreases, but the possibility of quality degradation increases, and there is a possibility that the percentage of observers who feel a sense of incongruity increases. On the contrary, if the value of the threshold $p_{th}$ is small, the adjustment frequency increases, but the percentage of observers who feel a sense of incongruity decreases. Accordingly, the value of the threshold $p_{th}$ is determined based on characteristics and usage environment of the projection apparatus according to the present embodiment.

$$|ap - ma| > pth \quad \text{[Expression 7]}$$

(Third Unit)

Subsequently, operations of the third unit 13 will be described in detail. The third unit 13 adjusts the stereoscopic degree of a partial stereoscopic image by the adjustment amount calculated by the second unit 12. The third unit 13 has the following two units.

(a) A unit that calculates a parallax $p_a$ to be applied to generation of the stereoscopic image (b) A unit that generates the output stereoscopic image 105 by applying the parallax $p_a$ The unit that calculates the parallax $p_a$ to be applied to generation of the stereoscopic image performs calculation indicated by [Expression 8] on a parallax $p_i$ that the input stereoscopic image 104 has, and calculates the parallax $p_a$.

$$p_a = p_i + \Delta P \quad \text{[Expression 8]}$$

Subsequently, the unit that generates the output stereoscopic image 105 by applying the parallax $P_a$ applies the calculated parallax $p_a$ to the input stereoscopic image 104, generates the left image and the right image, and thereafter overlaps the stereoscopic image 103 of the indicator on the left image and the right image to generate the output stereoscopic image 105.

As described above, the present embodiment achieves an effect for maintaining the same stereoscopic degree of a single object in the first projected image 21, the second projected image 22, and the overlapping region 23. Accordingly, the single object will not be discontinuous at the boundary between the first projected image 21 and the overlapping region 23 and the boundary between the second projected image 22 and the overlapping region 23, and it is unlikely that confusion occurs in fusion of the stereoscopic images in the brain. Also, since the indicator is generated by invisible light in the present embodiment, the stereoscopic degree of a stereoscopic image can be adjusted while the stereoscopic image to be displayed is being projected, without providing a time period for the adjustment.

Note that since the indicator 25 is generated for each of the partial stereoscopic images 21 and 22 to adjust the stereoscopic degree in the present embodiment, the above-described processing is performed for each of the stereoscopic images 21 and 22. That is to say, a first indicator to be overlapped with the stereoscopic image 21 and a second indicator to be overlapped with the stereoscopic image 22 are generated in the region 23 where the stereoscopic images 21 and 22 overlap each other, and the parallax is detected for each of the first and second indicators to calculate the adjustment amount. Then, the stereoscopic degree of the stereoscopic image 21 is adjusted by the adjustment amount calculated for the first indicator, and the stereoscopic degree of the second partial stereoscopic image 22 is adjusted by the adjustment amount calculated for the second indicator. The stereoscopic degree of each of the stereoscopic images 21 and 22 can thereby be adjusted to a predetermined target value, and the continuity of the stereoscopic degree in the overlapping region can be ensured. Here, the stereoscopic degrees of the partial stereoscopic images 21 and 22 do not need to be simultaneously adjusted, and for example, the stereoscopic image 22 may be adjusted after the stereoscopic image 21 is adjusted.

In the case of performing the adjustment such that the stereoscopic degree of one partial stereoscopic image is brought close to the stereoscopic degree of another partial stereoscopic image, the above-described adjustment processing is performed only on these stereoscopic images. For example, in the case of bringing the stereoscopic degree of the stereoscopic image 21 close to the stereoscopic degree of the stereoscopic image 22, the indicator to be overlapped with the stereoscopic image 21 is generated in the region 23 where the stereoscopic images 21 and 22 overlap each other. Then, the parallax of this indicator is detected, the adjustment amount is calculated such that the parallax of the indicator is brought close to the parallax of the stereoscopic image 22, and the stereoscopic degree of the stereoscopic image 21 is adjusted by this adjustment amount. The stereoscopic degree of the stereoscopic image 21 can thereby be brought close to the stereoscopic degree of the stereoscopic image 22, and the continuity of the stereoscopic degree in the overlapping region 23 can be maintained.

Figure 8:
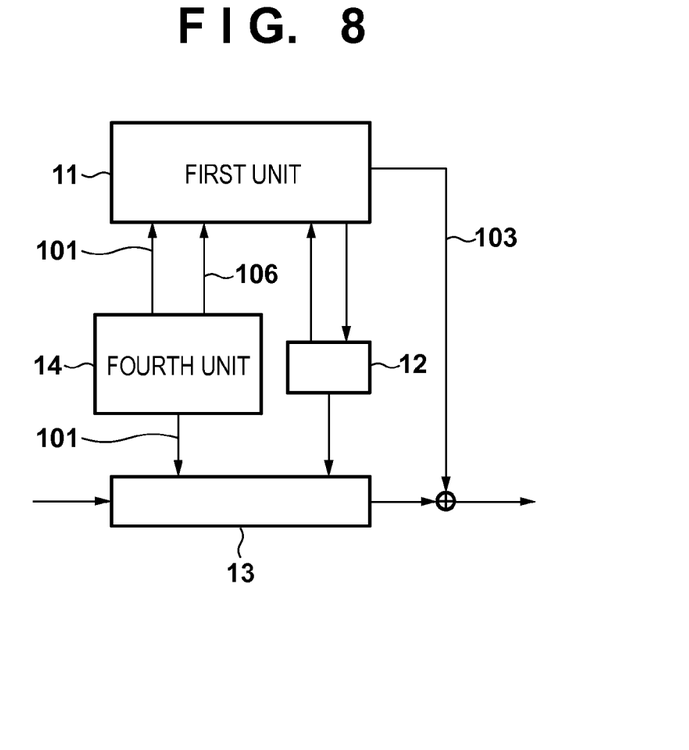
FIG. 8 is a block diagram showing a functional configuration of a stereoscopic image projection apparatus.

Subsequently, another embodiment of the present invention will be described. FIG. 8 is a block diagram schematically showing a functional configuration of a stereoscopic image projection apparatus (hereinafter referred to as a "projection apparatus") according to the present embodiment. A first unit 11 according to the present embodiment has a function of outputting an indicator 25 generated by visible light, in addition to a function of outputting an indicator 25 generated by invisible light. Also, the stereoscopic image projection apparatus in the present embodiment has a fourth unit 14 in addition to the first unit 11, the second unit 12, and the third unit 13 described in the above-described embodiment. Note that the functions of the second unit 12 and the third unit 13 in the present embodiment are the same as those in the above-described embodiment.

The first unit 11 according to the present embodiment has a function of generating the indicator 25 using visible light, in addition to a function of generating the indicator 25 using invisible light. The first unit 11 further has a function of outputting the indicators 25 while switching between the indicator 25 generated by invisible light and the indicator 25 generated by visible light in accordance with an operation of an operator (user). Also, the operator can set specifications and a display color of the visible light indicator 25, the shape of the indicator 25 including the size of the major indicator 26 and the minor indicators 27 and the number of minor indicators 27, and the generation position of the indicator 25 and the number of indicators 25 to be generated.

Subsequently, operations of the fourth unit 14 in the present embodiment will be described in detail. The fourth unit 14 has at least the following three functions.

A function by which the operator changes the adjustment amount 101

A function of switching between the invisible light indicator 25 and the visible light indicator 25

A function of changing specifications of the visible light indicator 25

The operator changes the adjustment amount 101 based on the indicator 25 generated by visible light. The present embodiment does not depend on a device that gives an instruction of the amount of change of the adjustment amount 101. If the fourth unit 14 can input the amount of change of the adjustment amount 101, any device may be used. Exemplary devices that give an instruction of the amount of change of the adjustment amount 101 are listed below.

An on-Screen Display (OSD)

Figure 9:
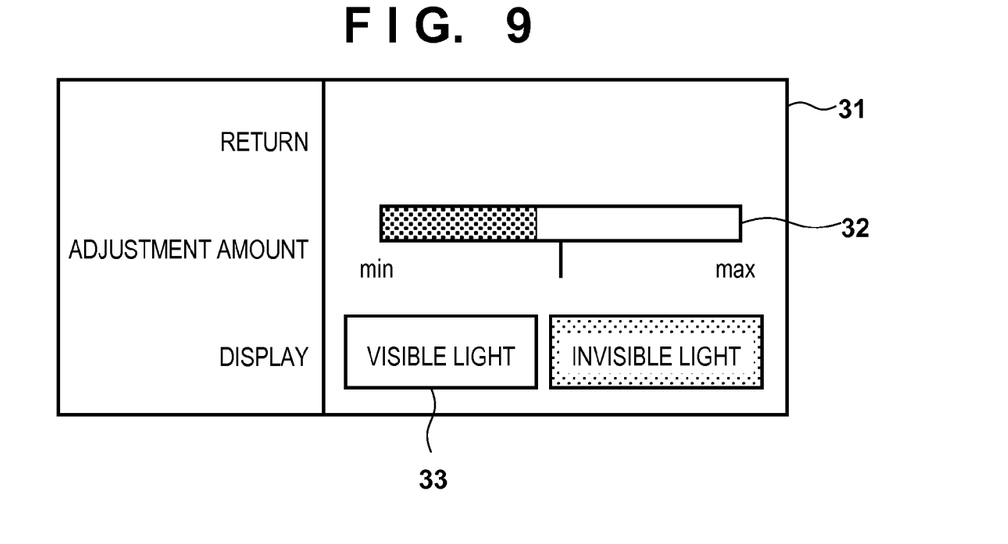
FIG. 9 is a diagram showing an exemplary adjustment amount change menu.

A touch panel contained in the projection apparatus according to the present embodiment A button switch A lever-type variable resistor or a rotary variable resistor FIG. 9 shows an exemplary menu display for changing the adjustment amount 101 on an OSD or a touch panel. An adjustment amount change menu 31 shown in FIG. 9 includes an adjustment amount indicator 32 indicating a value of the current adjustment amount 101, and an indicator select button 33 for selecting the indicator 25. Note that the menu for changing the adjustment amount 101 on an OSD or a touch panel shown in FIG. 9 is an example, and is not limited to the mode shown here.

With an OSD, the operator changes the adjustment amount 101 by operating a button, a lever, or a rotary knob on an operation panel of the projection apparatus according to the present embodiment. With a touch panel, the operator changes the adjustment amount 101 by directly touching the section of the adjustment amount indicator 32. Then, the adjustment amount indicator 32 displays the new current adjustment amount 101 in accordance with the adjustment amount 101 having been changed.

The indicator select button 33 is a button for selecting the indicator 25 to be output. With an OSD, the selection is made using a button on the operation panel of the projection apparatus according to the present embodiment. On the other hand, with a touch panel, the selection is made by touching directly. In the embodiment shown in FIG. 9, the indicator 25 generated by visible light is selected.

If the operator selects the visible light indicator 25 using the indicator select button 33, the first unit 11 according to the present embodiment outputs the visible light indicator 25. On the contrary, if the operator selects the invisible light indicator 25, the first unit 11 according to the present embodiment outputs the invisible light indicator 25. The display of the menu for changing the adjustment amount 101 on the OSD or the touch panel shown in FIG. 9 ends if no operation is made for a certain time period, and the invisible light indicator 25 is selected as the indicator 25 to be output. Furthermore, the fourth unit 14 has a function of changing the specifications of the indicator 25, i.e., the display color, the shape, and the generation position of the indicator 25, as well as the number of indicators 25 to be generated. Note that the display color that the fourth unit 14 can change for the visible indicator 25 is within the range of visible light.

The operator sets the specifications of the indicator 25 using an input device that the fourth unit 14 has, so as to make the indicator 25 appropriate for the change of the adjustment amount 101. The present embodiment does not depend on an input device to be used for setting the specification of the indicator 25. Any device may be used that can input the specifications of the indicator 25. For example, a device similar to a device that gives an instruction of the amount of change of the adjustment amount 101 may be used. Setting specifications 106 that have been input by the operator operating the fourth unit 14 are input to the first unit 11. The first unit 11 generates the visible light indicator 25 based on values of the setting specifications 106.

As described above, in the present embodiment, the indicator is generated by visible light or invisible light in accordance with an instruction from an operator, and in the case of generating the indicator using visible light, the stereoscopic degree of a partial stereoscopic image is adjusted in accordance with an instruction from the operator. Specifically, change of the adjustment amount 101 by the operator is enabled in addition to automatic adjustment thereof using the invisible light indicator 25. Accordingly, the stereoscopic degree can be appropriately adjusted using perception of the operator, and an effect for enabling the adjustment in more various situations is achieved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a technique can be provided for enabling adjustment of a difference in a stereoscopic degree occurring between an overlapping region and the other region to be adjusted in a multi-projection system that projects a stereoscopic image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146295, filed on Jul. 16, 2014 which is hereby incorporated by reference herein in its entirety.

What is claimed is:

1. An adjustment apparatus for adjusting a stereoscopic degree of at least one of a plurality of projection apparatuses for displaying one stereoscopic image obtained by projecting a plurality of stereoscopic images such that portions thereof overlap each other, the adjustment apparatus comprising:

a projection control unit configured to cause a projection unit of at least one of the plurality of projection apparatuses to project a left image including an indicator and a right image including an indicator, wherein the indicators are used to detect a parallax between the left image and the right image, and wherein at least a part of each of the indicators is projected by the projection unit in an overlapping region where the plurality of stereoscopic images overlap each other;

a detection unit configured to detect the parallax between the left image and the right image based on a captured image of the indicators which are projected by the projection unit; and an adjustment unit configured to adjust the stereoscopic degree of the projection unit by an adjustment amount that is determined based on a comparison of a parallax between the left image and the right image with a predetermined value.

2. The adjustment apparatus according to claim 1, wherein each of the indicators includes a plurality of parts, and the plurality of parts includes parts having stereoscopic degrees that are different from each other, and wherein the adjustment unit compares parallaxes of captured images of the parts having stereoscopic degrees that are different from each other with the predetermined value, and adjusts the stereoscopic degrees of the plurality of stereoscopic images.

3. The adjustment apparatus according to claim 2, wherein the projection unit projects some of the plurality of parts within the overlapping region, and projects the remaining parts outside the overlapping region.

4. The adjustment apparatus according to claim 1, wherein the projection unit projects, in a region where a first partial stereoscopic image and a second partial stereoscopic image overlap each other, a first indicator that and a second indicator,  wherein the detection unit detects a parallax of each of the first indicator and the second indicator, and  wherein the adjustment unit adjusts a stereoscopic degree of the first partial stereoscopic image by an adjustment amount that is based on the parallax of the first indicator, and adjusts a stereoscopic degree of the second partial stereoscopic image by an adjustment amount that is based on the parallax of the second indicator.

5. The adjustment apparatus according to claim 1, wherein each of the indicators is generated by invisible light.

6. The adjustment apparatus according to claim 1, wherein the projection unit projects each of the indicators using visible light or invisible light in accordance with an instruction from an operator, and  wherein if the indicator is projected using visible light, the adjustment unit adjusts the stereoscopic degrees of the plurality of stereoscopic images in accordance with an instruction from the operator.

7. The adjustment apparatus according to claim 1, wherein the plurality of stereoscopic images that are to be displayed are moving images.

8. The adjustment apparatus according to claim 7, wherein the adjustment unit adjusts the stereoscopic degrees of the plurality of stereoscopic images for each frame of the moving images.

9. The adjustment apparatus according to claim 7, wherein the adjustment unit adjusts the stereoscopic degrees of the plurality of stereoscopic images if an adjustment amount that is determined based on the parallax detected by the detection unit exceeds a predetermined threshold.

10. An adjustment method for adjusting a stereoscopic degree of at least one of a plurality of projection apparatuses for displaying one stereoscopic image obtained by projecting a plurality of stereoscopic images such that portions thereof overlap each other, the adjustment method comprising:

a controlling step of causing a projection unit of at least one of the plurality of projection apparatuses to project a left image including an indicator and a right image including an indicator, wherein the indicators are used to detect a parallax between the left image and the right image, and wherein at least a part of each of the indicators is projected by the projection unit in an overlapping region where the plurality of stereoscopic images overlap each other;

a detection step of detecting the parallax between the left image and the right image based on a captured image of the indicators which are projected by the projection unit; and  an adjustment step of adjusting the stereoscopic degree of the projection unit by an adjustment amount that is determined based on a comparison of a parallax between the left image and the right image with a predetermined value.

11. A non-transitory computer-readable storage medium storing a computer program for causing a computer to function as units of an adjustment apparatus for adjusting a stereoscopic degree of at least one of the plurality of projection apparatuses for displaying one stereoscopic image obtained by projecting a plurality of stereoscopic images such that portions thereof overlap each other, the units comprising:

a projection control unit configured to cause a projection unit of at least one of the plurality of projection apparatuses to project a left image including an indicator and a right image including an indicator, wherein the indicators are used to detect a parallax between the left image and the right image, and wherein at least a part of each of the indicators is projected by the projection unit in an overlapping region where the plurality of stereoscopic images overlap each other;

a detection unit configured to detect the parallax between the left image and the right image based on a captured image of the indicators which are projected by the projection unit; and  an adjustment unit configured to adjust the stereoscopic degree of the projection unit by an adjustment amount that is determined based on a comparison of a parallax between the left image and the right image with a predetermined value.

\* \* \* \* \*